United States Patent
Blake (10) Patent No.: US 9,506,407 B2
(45) Date of Patent: Nov. 29, 2016

(54) ENGINE HAVING ACTIVE EXHAUST VALVE POSITION CONTROL SYSTEM AND METHOD

(71) Applicant: Polaris Industries Inc., Medina, MN (US)

(72) Inventor: Dallas J. Blake, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 286 days.

(21) Appl. No.: 14/151,983

(22) Filed: Jan. 10, 2014

(65) Prior Publication Data

US 2015/0198098 A1   Jul. 16, 2015

(51) Int. Cl.
| | |
|---|---|
| *F02D 13/00* | (2006.01) |
| *F02D 13/02* | (2006.01) |
| *F02D 35/02* | (2006.01) |
| *F02B 75/02* | (2006.01) |
| *F02D 41/22* | (2006.01) |

(52) U.S. Cl.
CPC .......... *F02D 13/02* (2013.01); *F02D 13/0284* (2013.01); *F02B 2075/025* (2013.01); *F02D 35/027* (2013.01); *F02D 2041/227* (2013.01); *F02D 2200/021* (2013.01); *F02D 2250/34* (2013.01); *F02D 2400/04* (2013.01); *Y02T 10/18* (2013.01)

(58) Field of Classification Search
CPC .............. F02D 13/02; F02D 13/0284; F02D 2041/227; F02D 2250/34; F02D 35/027; F02D 2075/025; F02D 2200/021; F02D 2400/04
USPC .............. 123/345, 90.11–90.17, 90.24–90.26
See application file for complete search history.

(56) References Cited

U.S. PATENT DOCUMENTS

| | | | |
|---|---|---|---|
| 2,834,608 A | 5/1958 | Wixson | |
| RE26,775 E | 1/1970 | Smieja | |
| 3,688,856 A | 9/1972 | Boehm et al. | |
| 3,712,416 A | 1/1973 | Swanson et al. | |
| 3,840,082 A | 10/1974 | Olson | |

(Continued)

FOREIGN PATENT DOCUMENTS

| | | |
|---|---|---|
| CA | 1150752 | 7/1983 |
| CA | 2561337 A1 | 9/1999 |

(Continued)

OTHER PUBLICATIONS

International Search Report and Written Opinion issued by the European Patent Office for International Application No. PCT/US2013/025354, mailed Sep. 18, 2014; 13 pages.

(Continued)

*Primary Examiner* — Thomas Moulis
*Assistant Examiner* — Joseph Dallo
(74) *Attorney, Agent, or Firm* — Faegre Baker Daniels LLP (57) ABSTRACT

A system and method selectively reduce power of an engine having at least one piston movable in a cylinder and an exhaust port includes providing an exhaust valve in communication with the exhaust port of the engine. The exhaust valve has an adjustable position to change an effective size of the exhaust port. The system and method also include sensing a condition likely to cause damage to the piston of the engine and adjusting a position of the exhaust valve to reduce a size of the exhaust port in response to sensing the condition likely to cause damage to the piston of the engine, thereby limiting power of the engine.

7 Claims, 4 Drawing Sheets

(56) References Cited

U.S. PATENT DOCUMENTS

| | | | |
|---|---|---|---|
| 3,933,213 A | 1/1976 | Trowbridge | |
| 3,969,895 A | 7/1976 | Krizman | |
| RE28,922 E | 8/1976 | Lloyd, III | |
| 3,977,493 A | 8/1976 | Richardson | |
| 4,222,453 A | 9/1980 | Fixsen et al. | |
| 4,339,156 A | 7/1982 | Livesay | |
| 4,407,386 A | 10/1983 | Yasui et al. | |
| 4,442,913 A | 4/1984 | Grinde | |
| 4,858,722 A | 8/1989 | Abbe et al. | |
| 4,917,207 A | 4/1990 | Yasui et al. | |
| 4,987,965 A | 1/1991 | Bourret | |
| 5,060,745 A | 10/1991 | Yasui et al. | |
| 5,370,198 A | 12/1994 | Karpik | |
| 5,692,759 A | 12/1997 | Flynn | |
| 5,697,332 A | 12/1997 | Asai et al. | |
| 5,727,643 A | 3/1998 | Kawano et al. | |
| 5,860,486 A | 1/1999 | Boivin et al. | |
| 5,947,217 A | 9/1999 | Snare et al. | |
| 6,161,908 A | 12/2000 | Takayama et al. | |
| 6,227,323 B1 | 5/2001 | Ashida | |
| 6,321,864 B1 | 11/2001 | Forbes | |
| 6,343,578 B1* | 2/2002 | Kerkau | F01L 13/0042 123/90.15 |
| 6,379,411 B1 | 4/2002 | Turner | |
| 6,390,219 B1 | 5/2002 | Vaisanen | |
| 6,461,208 B2 | 10/2002 | Suzuki | |
| 6,551,385 B2 | 4/2003 | Turner | |
| 6,554,665 B1 | 4/2003 | Kaneko | |
| RE38,124 E | 5/2003 | Mallette et al. | |
| 6,557,530 B1* | 5/2003 | Benson | F02D 41/22 123/447 |
| 6,568,030 B1 | 5/2003 | Watanabe | |
| 6,595,309 B1 | 7/2003 | Savage et al. | |
| 6,626,258 B1 | 9/2003 | Forbes | |
| 6,695,083 B2 | 2/2004 | Nakamura et al. | |
| 6,755,271 B1 | 6/2004 | Berg | |
| 6,823,834 B2* | 11/2004 | Benson | F02D 41/22 123/299 |
| 6,926,108 B1 | 8/2005 | Polakowski et al. | |
| 6,942,050 B1 | 9/2005 | Honkala et al. | |
| 7,040,437 B1 | 5/2006 | Fredrickson et al. | |
| 7,047,924 B1* | 5/2006 | Waters | F01L 13/0036 123/345 |
| 7,063,057 B1* | 6/2006 | Waters | F01L 1/022 123/346 |
| 7,182,165 B1 | 2/2007 | Keinath et al. | |
| 7,237,803 B2 | 7/2007 | Nguyen | |
| 7,444,236 B2* | 10/2008 | Wiles | F02D 13/0207 123/90.15 |
| 7,455,141 B2 | 11/2008 | Hildebrand | |
| 7,761,217 B2* | 7/2010 | Waters | F01L 1/185 123/90.16 |
| 8,602,159 B2 | 12/2013 | Harris et al. | |
| 8,893,835 B2 | 11/2014 | Nam et al. | |
| 9,174,702 B1 | 11/2015 | Gauthier et al. | |
| 2003/0172907 A1* | 9/2003 | Nytomt | F02D 35/023 123/406.14 |
| 2004/0089492 A1 | 5/2004 | Eide | |
| 2004/0187826 A1 | 9/2004 | Kino | |
| 2004/0262064 A1 | 12/2004 | Lefort | |
| 2005/0199432 A1 | 9/2005 | Abe et al. | |
| 2005/0199433 A1 | 9/2005 | Abe et al. | |
| 2005/0205320 A1 | 9/2005 | Girouard et al. | |
| 2005/0225067 A1 | 10/2005 | Nguyen | |
| 2005/0279552 A1 | 12/2005 | Schuehmacher et al. | |
| 2006/0085966 A1 | 4/2006 | Kerner et al. | |
| 2006/0180370 A1 | 8/2006 | Polakowski et al. | |
| 2007/0017480 A1* | 1/2007 | Kondo | F01L 1/053 123/198 F |
| 2007/0028877 A1* | 2/2007 | McDonald | F01L 1/146 123/90.35 |
| 2007/0199753 A1 | 8/2007 | Giese et al. | |
| 2007/0227810 A1 | 10/2007 | Sakurai | |
| 2007/0246283 A1 | 10/2007 | Giese et al. | |
| 2008/0141957 A1* | 6/2008 | Dea | F01L 9/023 123/90.11 |
| 2009/0217908 A1* | 9/2009 | Watanabe | F01L 1/34 123/406.37 |
| 2009/0294197 A1 | 12/2009 | Polakowski et al. | |
| 2010/0071982 A1 | 3/2010 | Giese | |
| 2010/0089355 A1 | 4/2010 | Fredrickson et al. | |
| 2010/0108427 A1 | 5/2010 | Richer | |
| 2010/0269771 A1* | 10/2010 | Wermuth | F02D 13/0211 123/90.16 |
| 2011/0100340 A1* | 5/2011 | Mukkala | F02D 41/0007 123/564 |
| 2011/0139529 A1 | 6/2011 | Eichenberger | |
| 2012/0143465 A1* | 6/2012 | Kim | F01L 13/0026 701/102 |
| 2012/0205902 A1 | 8/2012 | Beavis et al. | |
| 2013/0233265 A1* | 9/2013 | Zurface | F01L 1/18 123/90.46 |

FOREIGN PATENT DOCUMENTS

| | | |
|---|---|---|
| EP | 0287038 | 10/1988 |
| JP | H01 113527 | 5/1989 |
| JP | 2001065344 | 3/2001 |
| WO | WO 95/01503 | 1/1995 |
| WO | WO 01/05613 | 1/2001 |
| WO | WO 02/087957 | 11/2002 |
| WO | WO 2007/100751 A2 | 9/2007 |
| WO | WO 2009/114414 A1 | 9/2009 |
| WO | WO 2011/093847 A1 | 8/2011 |
| WO | WO 2011/099959 | 8/2011 |

OTHER PUBLICATIONS

International Preliminary Report on Patentability issued by the European Patent Office for International Application No. PCT/US2013/025354, mailed Jun. 4, 2014; 18 pages.

International Search Report and Written Opinion, issued by the European Patent Office, dated Nov. 6, 2007 for International Application No. PCT/US2007/004895; 20 pages.

International Preliminary Report on Patentability, issued by the European Patent Office, Jun. 10, 2008, for International Application No. PCT/US2007/004895; 22 pages.

International Search Report and Written Opinion, issued by the European Patent Office, mailed Jul. 2, 2010, for International Application No. PCT/US2009/066093; 14 pages.

Annex to Form PCT/ISA/206 Communication Relating to the Results of the Partial International Search issued by the European Patent Office, mailed Mar. 2, 2010, Rijswijk, Netherlands, for a related international PCT Application No. PCT/US2009/066093; 6 pages.

International Preliminary Report on Patentability, issued by the International Bureau of WIPO, Geneva, Switzerland, dated Jul. 19, 2011, for International Application No. PCT/US2009/066093; 9 pages.

International Search Report and Written Opinion issued by the Eruropean Patent Office for PCT/US2015/010623, mailed Mar. 24, 2015, 11 pages.

International Search Report and Written Opinion issued by the European Patent Office for PCT/US2015/010621, mailed Aug. 12, 2014, 17 pages.

Written Opinion issued by the European Patent Office for International Application No. PCT/US2015/010623, mailed Feb. 5, 2016, 8 pages.

\* cited by examiner

ENGINE HAVING ACTIVE EXHAUST VALVE POSITION CONTROL SYSTEM AND METHOD

BACKGROUND AND SUMMARY OF THE DISCLOSURE

The present disclosure relates to a system and method for selectively limiting power of an engine. More particularly, the present disclosure relates to a system and method which uses an adjustable position exhaust valve to power limit the engine to reduce the likelihood damage to the engine when certain fault conditions occur.

Two-stroke engines, particularly those used in snowmobile or other cold weather vehicle applications, create a unique set of challenges for controlling the power output capability of the engine to protect the engine during both present fault states and anticipated fault states. These two-stroke engines have highly tuned exhaust systems. Exhaust temperature has of a significant impact on both trapping and scavenging efficiency. Therefore, traditional soft engine speed/power limiters with progressive increment/decrement strategies operate with mixed success. The implementation of such engine speed/power limiters often results in a loss in vehicle momentum which is very noticeable to the driver.

A conventional approach for limiting engine speed and power is to reduce the engine speed by stopping the fuel and or ignition signal such that an entire engine cycle is missed and the engine is merely motored. This mechanism can be implemented in a progressive nature such that the frequency and pattern of missed cycles changes if the fault is not removed or the power and/or engine speed is not reduced significantly enough to protect the engine.

Modern high specific power two-stroke engines operate very close a detonation limit at a high power output. This forces engine calibrations to reduce power output so that there is a suitable stability margin on the lean side of a calibration window to account for engine production tolerances and range of fuel composition and fuel quality on the market today. As such, with a missed cycle engine speed limiter, when the ignition is removed and then reinstated it can introduce both a significant change in exhaust temperature as well as a detonation even at the point of reinstatement due to the significant change in ignition timing over the course of a very small number of cycles.

The system and method of the present disclosure uses a multi-state active exhaust system which limits engine power that is used in conjunction with or in place of a traditional, multi-severity soft engine speed limiters. Having active control of the exhaust valve position allows for a maximum valve position to be adjusted on the fly to change the effective size of an exhaust port. Changing exhaust port size alters a maximum engine speed and power output while being less intrusive to the rider than the use of a missed cycle engine speed limiter.

In one embodiment of the present disclosure, an active exhaust valve position control provides a plurality of discrete mechanical valve states for positioning an exhaust valve. Detection of system faults causes an electronic control unit to adjust the exhaust valve between the discrete mechanical valve states in order to adjust the size of the exhaust port and limit engine power.

In another illustrated embodiment of the present disclosure, the active exhaust valve position control provides a plurality of intermediate positions between the discrete mechanical valve states. In this embodiment, large severity events cause the system to adjust the valve position between the discrete mechanical valve states, while low severity events adjust the exhaust valve position incrementally between the discrete valve states without changing the current valve state. In yet another illustrated embodiment of the present disclosure, the frequency of the low severity events impacts the maximum valve state by means of a non-dimensional weighting factor or a direct linear frequency threshold conditional dependency on either the intra state steps or the discrete valve state position steps.

The system and method of the present disclosure provides active manipulation of engine speed and/or engine power output by reducing the size and timing of an exhaust port of the engine. Unlike conventional missed cycle speed limit control strategies, the system and method of the present disclosure does not attempt to operate the engine in modes substantially different from the normal, non-fault operation. The system and method of the present disclosure relies of the exhaust port limiting to reduce the power capacity, volumetric efficiency and engine speed of the engine in the same manner that would occur if the exhaust port was smaller than designed. Therefore, the engine reduces airflow capacity for the given smaller exhaust port. In effect, the engine operates completely normal in this state, the only difference being that the operating window (engine speed and power) is reduced. The initiation of the speed/power limiter of the present disclosure is less intrusive to the driver while the power is reduced by the same amount as conventional power limiters.

According to an illustrated embodiment of the present disclosure, a method for selectively reducing power of an engine having at least one piston movable in a cylinder and an exhaust port includes providing an exhaust valve in communication with the exhaust port of the engine. The exhaust valve has an adjustable position to change an effective size of the exhaust port. The method also includes sensing a condition likely to cause damage to the piston of the engine, and adjusting a position of the exhaust valve to reduce a size of the exhaust port in response to sensing the condition likely to cause damage to the piston of the engine, thereby limiting power of the engine.

According to another illustrated embodiment of the present disclosure, an engine includes at least one piston movable in a cylinder, an inlet port, an exhaust port, and an exhaust valve in communication with the exhaust port. The exhaust valve has an adjustable position to change an effective size of the exhaust port. The engine also includes a sensor configured to sense a condition likely to cause damage to the piston of the engine, and an engine control coupled to the sensor. The engine control unit is configured to adjust a position of the exhaust valve to reduce a size of the exhaust port in response to sensing the condition likely to cause damage to the piston of the engine, thereby limiting power of the engine.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and additional features of the present system and method will become more readily appreciated and become better understood by reference to the following detailed description when taken in conjunction with the accompanying drawings.

Although the drawings represent embodiments of various features and components according to the present disclosure, the drawings are not necessarily to scale and certain features may be exaggerated in order to better illustrate and explain the present disclosure.

DETAILED DESCRIPTION OF THE DRAWINGS

For the purposes of promoting an understanding of the principles of the present disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It is understood that no limitation of the scope of the invention is thereby intended. The present invention includes any alterations and further modifications in the illustrated devices and described methods and further applications of the principles of the invention which would normally occur to one skilled in the art to which the invention relates.

Figure 1:
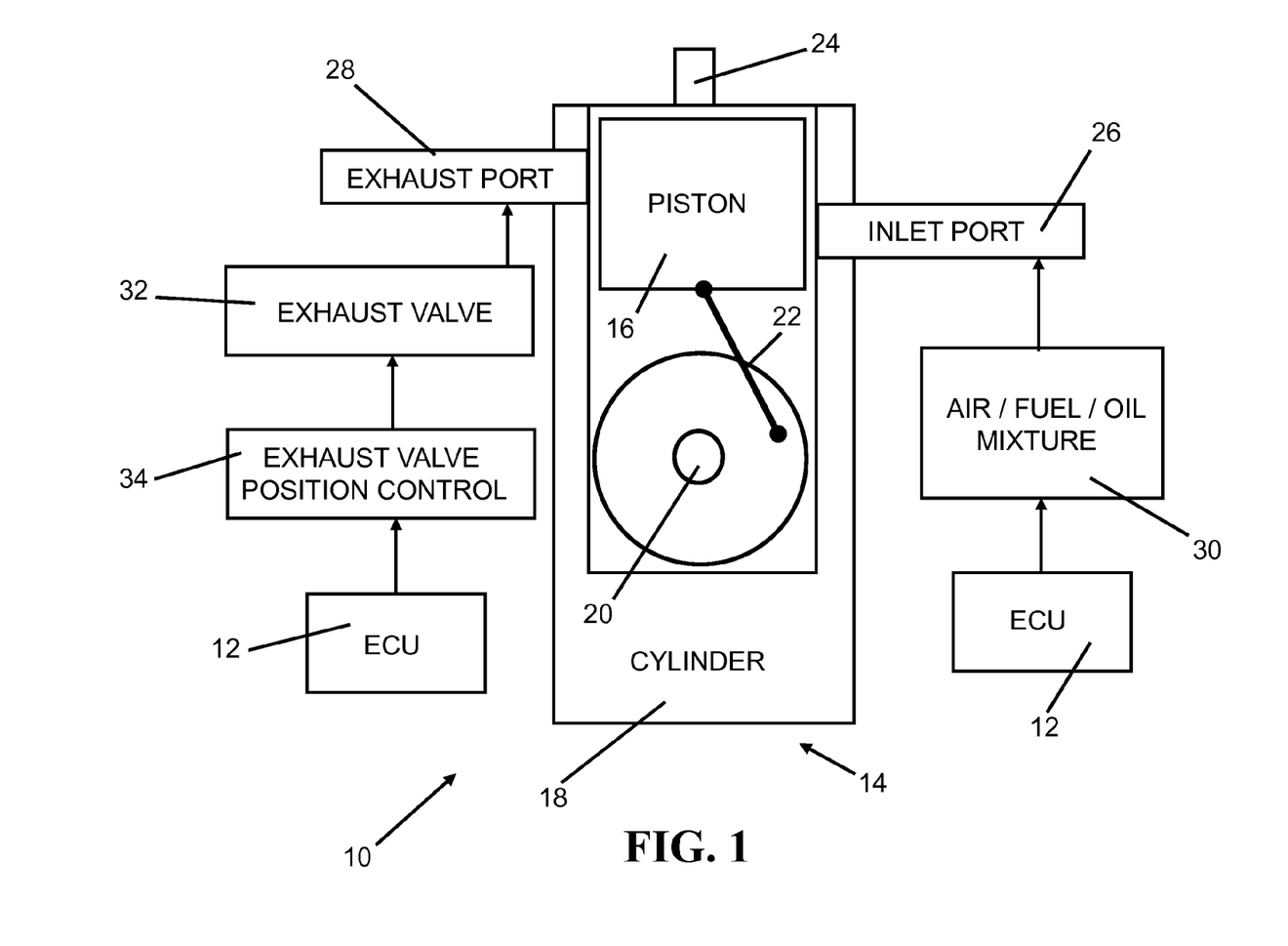
FIG. 1 is a block diagram illustrating an engine having a piston, a cylinder, an inlet port, and an exhaust port having an exhaust valve with an adjustable position to change a maximum size of the exhaust port.

Referring now to the drawings, FIG. 1 illustrates an active exhaust control system 10 controlled by an engine control unit (ECU) 12 of engine 14 in accordance with one embodiment of the present disclosure. The engine 14 includes at least one piston 16 movable within a cylinder 18. Piston 16 is connected to a crank shaft 20 by connecting arm 22 in a conventional manner. A spark plug 24 provides ignition to drive the piston 16. An inlet port 26 and an exhaust port 28 are provided for each cylinder 18 in a conventional manner. An air, fuel and oil mixture is provided in a conventional manner through inlet port 26 as illustrated at block 30. The air, fuel and oil mixture at block 30 is controlled by the ECU 12.

In an illustrated embodiment, the engine 14 is a two-stroke engine particularly designed for use in a snowmobile, ATV, UTV, or other similar vehicle. Two-stroke engines, particularly those used in snowmobiles or other cold weather applications, create a unique set of challenges for controlling power output capability of the engine 14 to protect the engine 14 during both present fault states and anticipated fault states.

The active exhaust valve control system 10 includes an adjustable position exhaust valve 32 in communication with the exhaust port 28. An exhaust valve position control 34 is configured to adjust the position of the exhaust valve 32 to set a maximum size of the exhaust port 28. The exhaust valve position control 34 is controlled by ECU 12.

Figure 2:
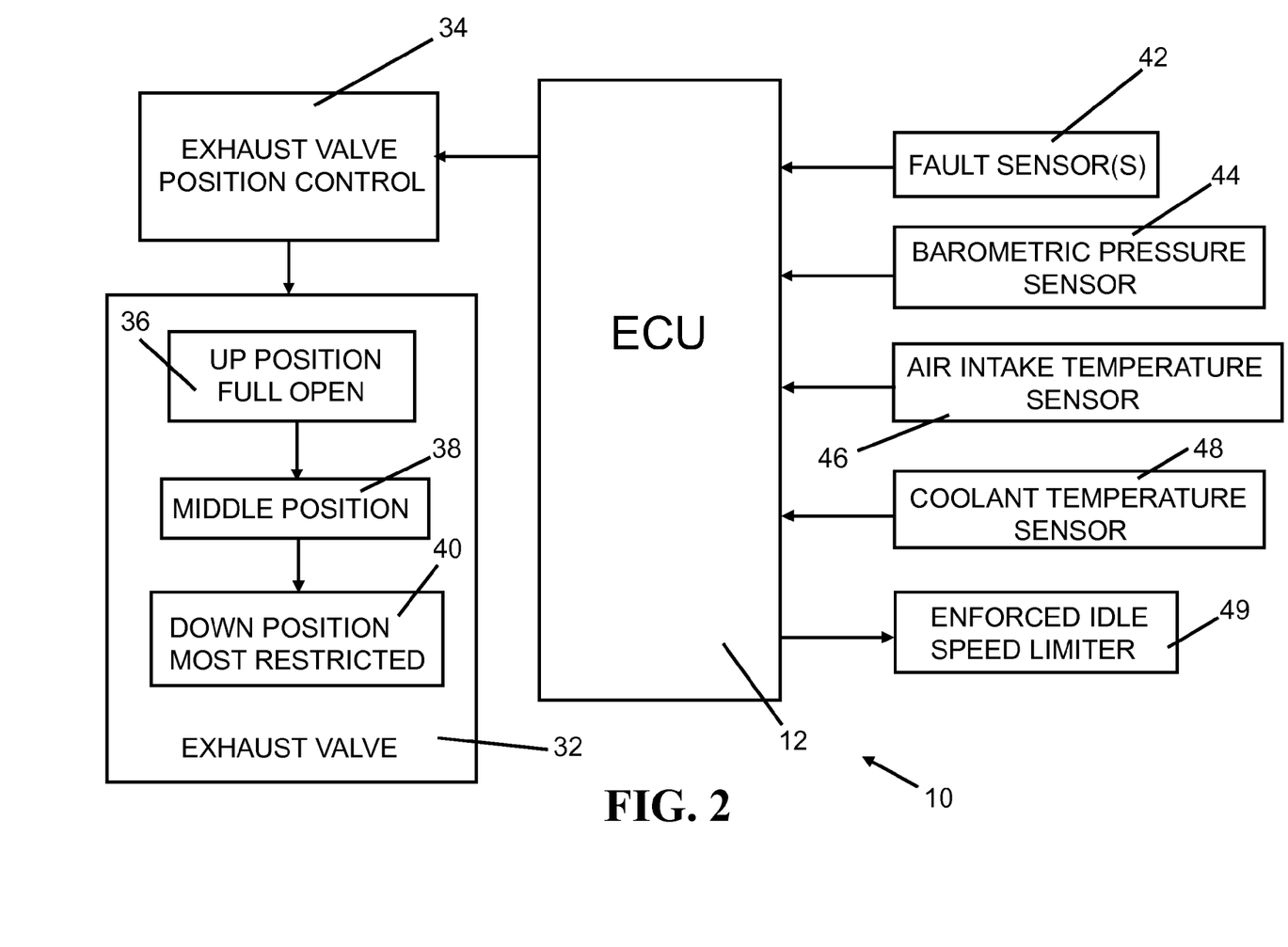
FIG. 2 is a block diagram illustrating further details of an exhaust valve position control for controlling a position of the exhaust valve based on outputs from a plurality of sensors.

Additional details of an illustrated embodiment of the present disclosure are illustrated in FIG. 2. The ECU 12 communicates with the exhaust valve position control 34 to control a position of the exhaust valve 32. In an illustrated embodiment of the present disclosure, the exhaust valve position control 34 is operable to move the exhaust valve 32 between a plurality of discrete mechanical states to adjust the size of the exhaust port 28. Illustratively, three such discrete states are disclosed including an up state position, a middle state position, and a down state position. It is understood that more or less discrete states may be provided, if desired. In an up state or position illustrated at block 36, the exhaust valve is in a full open position to allow a maximum exhaust flow through the exhaust port 28. Therefore, the engine 14 may operate at full power when the exhaust valve 32 is in the up state or position illustrated at block 36.

Exhaust valve position control 34 adjusts the exhaust valve to a middle state or position 38 in response to signals from ECU 12. The middle state or position 38 of exhaust valve 32 reduces the size of exhaust port 28 compared to the full open up state position 36. The exhaust valve position control 34 also moves the valve to a down state or position 40 in response to signals from ECU 12. In the down state position at block 40, the exhaust valve 32 further restricts the size of the exhaust port 28 to limit power of the engine 14.

As discussed below, ECU 12 monitors the plurality of fault sensors 42. These fault sensors 42 include, for example, a manifold pressure sensor, an intake temperature sensor, a detonation sensor, a valve position sensor, an exhaust temperature, and an engine water temperature sensor. ECU 12 is also coupled to a barometric pressure sensor 44, an air intake temperature sensor 46, and a coolant temperature sensor 48.

In an illustrated embodiment, the ECU 12 monitors the outputs of fault sensors 42, barometric pressure sensor 44, air intake temperature sensor 46, and coolant temperature 48. In response to detected fault conditions, anticipated fault conditions, excessively high temperatures or excessively low temperatures, the ECU 12 restricts the size of the exhaust port 28 by moving the exhaust valve 32 from its full open, up state position 36 to either the middle state position 38 or the down state position 40 to restrict the size of the exhaust port 28. By restricting the size of the exhaust port 28, the exhaust valve 32 restrict air flow through the engine thereby reducing engine power.

Having active control of the position of exhaust valve 32 allows for a maximum valve position to be implemented which, by the nature of the port geometry, size and timing alters the maximum engine speed and power output. Using the exhaust valve 32 position to control the available power of the engine when the possibility for thermal shock is present minimizes both the total load placed on the piston and the rate of thermal expansion by controlling both the maximum energy of combustion as well as the rate of energy input into the combustion chamber.

A piston scuff may be induced by a thermal shock caused either by a cold engine situation or a hot soak situation in which the engine is at a very warm temperature while the cooling system is at a relatively cold temperature. For example, cold scuff events occur when the engine and all components are at a cold temperature and a high power output is commanded before the engine is at operating temperature. This causes the aluminum piston 16 to expand faster than the cylinder 18 due to the increased coefficient of thermal expansion which can cause the transfer of material from the piston 16 to the cylinder 18 and subsequently the failure of the piston 16.

In addition, hot scuff events occur when the engine 14 is shut down when it is hot and the water temperature continues to increase while the engine 14 is shut off due to heat transfer from the exhaust, stator, cooling system, brakes etc. while the temperature of the cooling heat exchangers continues to drop. When the engine 14 is restarted, the cold water of the cooling system is rushed to the engine 14 which causes a considerable thermal shock and can lead to material transfer from the piston 16 to the cylinder 18 and subsequent failure.

Conventional methods to limit this type of thermal shock events are done in the piston profile and tolerance design such that under a cold scuff or hot scuff test, the piston, at a minimum clearance does not scuff. Additionally, cooling systems are traditionally designed to create a fast engine temperature warm up on cold start to minimize the time where a significant thermal shock cold scuff event is possible. Furthermore, the systems are also traditionally designed so that the thermostat is able to react fast enough that the time in which there is a very high negative thermal gradient into the engine cooling system is minimal.

Furthermore, attempts have been made in the past to implement missed cycle engine speed limiters that are temperature dependent to minimize the maximum power output and/or engine speed achievable under these situations. While a valid approach, implementation of engine speed limiters on two-stroke engines carries with it a completely different set of challenges.

The system and method of the present disclosure allows active manipulation of the engine speed and/or engine power output by reducing the size and timing of the exhaust port 28. Limiting the size of exhaust port 28 reduces the power capacity, volumetric efficiency and engine speed of the engine 14 in the same manner that would occur if the exhaust port 28 was smaller than designed for the engine 14. Therefore, the engine 14 naturally runs out of airflow capability for the given smaller exhaust port 28. In effect, the engine 14 operates completely normal in this state, the only difference being that the operating window (engine speed and power) is reduced.

The system and method of the present disclosure reduces the likelihood of detonation by going into an engine protection mode whenever system faults are detected. When excessive detonation is detected, the check engine light will illuminate and the ECU adjusts the position of the exhaust valve as discussed above to limit the power of the engine.

Figure 3:
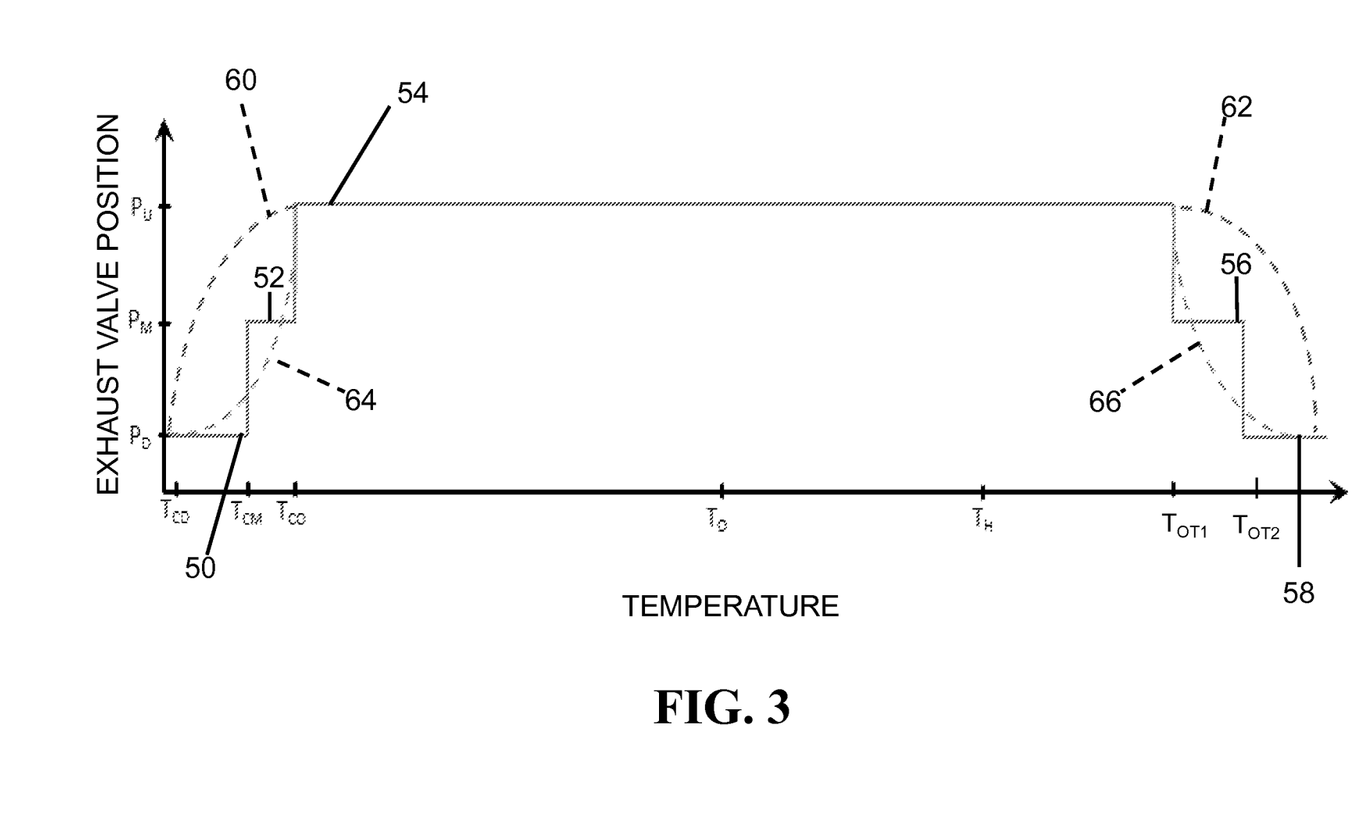
FIG. 3 is a graph showing changes in the position of the exhaust valve to adjust the maximum size of the exhaust port to limit power of the engine at different operating temperatures of the engine.

In one illustrated embodiment of the present disclosure is shown, for example, in FIG. 3. The ECU 12 adjusts the position of the exhaust valve 32 based on an output from coolant temperature sensor 48. In FIG. 3, the following symbols are used:

$T_{CD}$ is a temperature cold, exhaust valve down state position.

$T_{CM}$ is a temperature cold, exhaust valve middle state position.

$T_{CO}$ is a temperature cold, exhaust valve open or up state position.

$T_O$ is the normal operating temperature.

$T_H$ is a hot temperature level.

$T_{OT1}$ is a first over temperature level.

$T_{OT2}$ is a second over temperature level greater than $T_{OT1}$.

$P_D$ is an exhaust valve down state, most restricted position.

$P_M$ is an exhaust valve middle state position.

$P_U$ is an exhaust valve up state, full open position.

FIG. 3 illustrates operation of the active exhaust valve control system 10 of the present disclosure through various operating temperatures of the engine 14. When the temperature of the engine measured by coolant temperature sensor 48, for example, is at $T_{CD}$, the ECU 12 controls exhaust valve position control 34 to move the exhaust valve 32 to its down state 40. Therefore, the exhaust valve 32 minimizes the effective size of the exhaust port 28 to limit engine speed while the temperature of the engine is between $T_{CD}$ and $T_{CM}$.

When the temperature reaches $T_{CM}$, ECU 12 causes exhaust valve position control 34 to move the exhaust valve 32 to its middle state 38. This increases the size of the exhaust port 28 to allow increased airflow through the engine 14 compared to the down state 40 as indicated at location 52 in FIG. 3. Next, when the temperature of the engine reaches $T_{CO}$, ECU 12 causes exhaust valve position control 34 to move the exhaust valve 32 to its up state 36 as shown at location 54 in FIG. 3. This maximizes the exhaust port size so that full air flow is permitted through the engine 14 for optimum performance.

When the temperature of the engine 14 becomes too hot and an over temperature condition occurs at $T_{OT1}$, the ECU 12 causes exhaust valve position control 34 to move the exhaust valve 32 to its middle state 38 as illustrated at location 56 in FIG. 3. When the operating temperature reaches $T_{OT2}$, ECU 12 causes the exhaust valve control 34 to move the exhaust valve 32 to its down state 40 as illustrated at location 58 to further restrict airflow through the exhaust port 28.

In another embodiment of the present disclosure, the ECU 12 causes the exhaust valve position control 34 to move the exhaust value 32 directly to its down state for maximum restriction of the exhaust port 28 upon reaching the over hot temperature $T_{OT1}$. As discussed above, restricting the exhaust port 28 reduces power of the engine 14 to reduce the likelihood of engine damages at high operating temperatures.

In another embodiment of the present disclosure, the exhaust valve position control 34 is able to move the exhaust valve 32 incrementally to fine-tuned positions between the up state position 36, middle state position 38, and down state position 40. In other words, the exhaust valve 32 may be further adjusted to incremental positions between each of the up, middle and down states by the active exhaust valve control to further control the size of exhaust port 28.

FIG. 3 shows another embodiment of the present disclosure in which the exhaust valve 32 is incrementally moved by the exhaust valve control 34 upon detection of changes in temperature by the ECU 12. Dotted lines 60 and 62 show the position of the exhaust valve 32 as the temperature changes to minimize interruption of the power to engine. Dotted lines 64 and 66 illustrate exemplary movement of the exhaust valve 32 for maximizing protection of the engine during under temperature and over temperature conditions.

Figure 4:
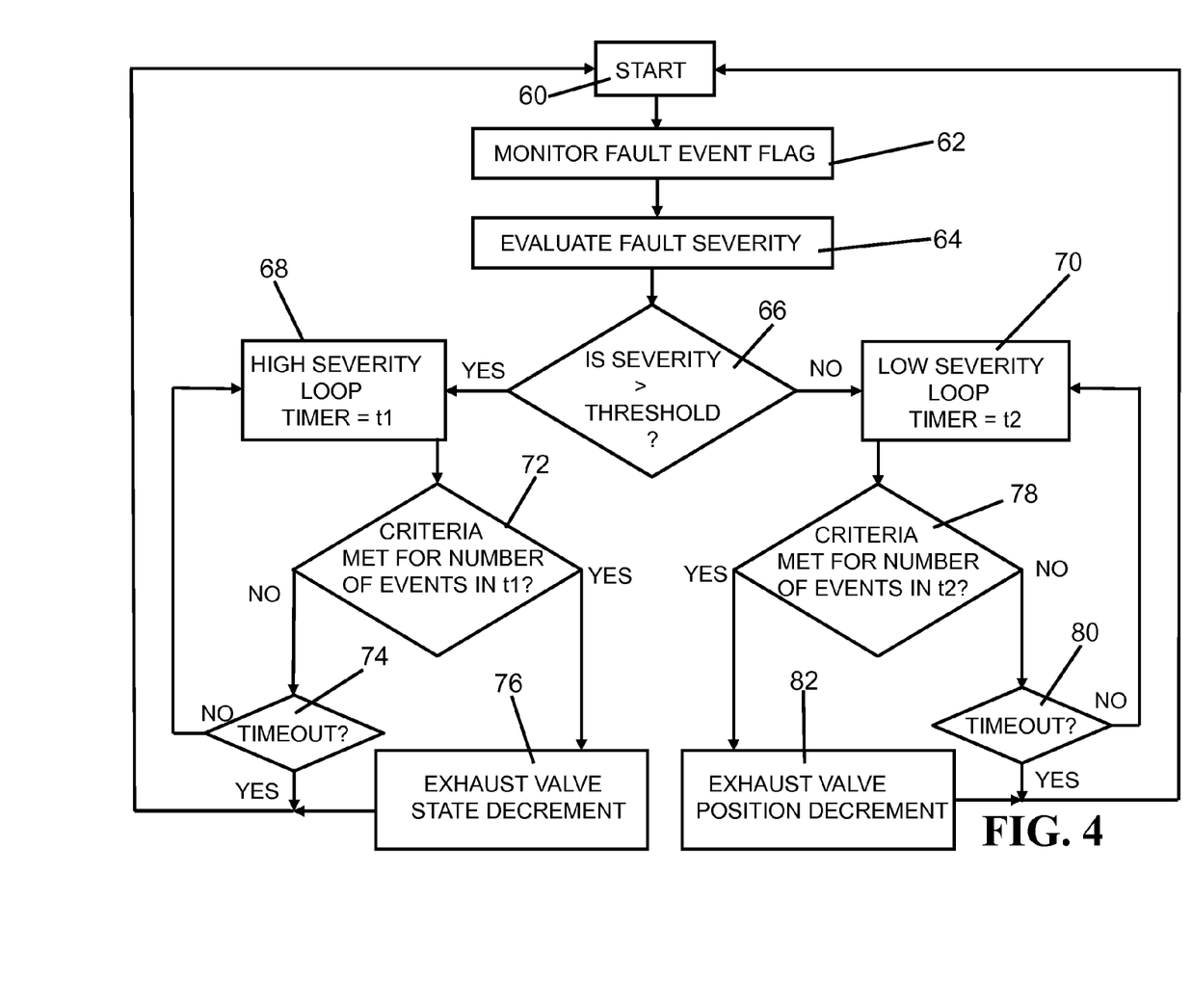
FIG. 4 is a flow chart illustrating control of positions of the exhaust valve based upon a severity of faults detected by the engine control unit.

FIG. 4 illustrates another embodiment for controlling the position of the exhaust valve 32 in response to detected engine faults from fault sensors 42, pressure sensor 44, or temperature sensors 46 and 48. The control system starts at block 60 and monitors fault event flags as illustrated at block 62 from the engine sensors 42, 44, 46 and 48. Next, the ECU 12 evaluates the severity of the detected faults as illustrated at block 64. ECU 12 determines whether the severity of the faults is greater than a predetermined threshold fault level as illustrated at block 66.

Examples of illustrative low severity faults include intermittent faults form the fault sensors 42 discuss above. Low severity faults may be determined for a sensor rate of change parameter above a first calibratable threshold, but below a second calibratable threshold. Other low severity faults include detonation events above a first calibratable intensity but below a second calibratable intensity Examples of illustrative high severity faults include persistent faults from the fault sensors 42. High severity faults may be determined for a sensor rate of change parameter above the second calibratable threshold or for detonation events above the second calibratable intensity.

If the severity of the detected faults is greater than the threshold value at block 66, the ECU 12 enters a high severity fault loop at block 68 and sets a loop timer to time t1. If the fault severity is less than the threshold at block 66, ECU 12 enters a low severity fault loop 70 and sets a loop timer to t2.

In the high severity loop 68, ECU 12 determines whether criteria has been met for the number of fault events during the time period t1 as illustrated at block 72. If not, ECU 12 determines whether a time out has occurred at block 74. If not, ECU 12 continues in the high severity loop at block 68. If a time out has occurred at block 74, ECU 12 returns to the start at block 60.

If the criteria has been met for the number of fault events within the time t1 at block 72, the ECU 12 decrements the state position of exhaust valve 32 as illustrated at block 76. In other words, if the exhaust valve 32 was initially in its up, full open state position 36, ECU 12 decrements the exhaust valve 32 to its middle state position 38. If the exhaust valve 32 was previously in the middle state position 38, the ECU 12 decrements the exhaust valve 32 to its down state position 40 at block 76. ECU then returns to the start at block 60.

In the low severity loop beginning at block 70, ECU 12 determines whether a criteria has been met for a number of fault events within the time period t2 as illustrated at block 78. In other words, ECU 12 determines whether a calibratable number of low severity fault events occur within a calibratable time period. If not, ECU 12 determines whether a time out has occurred at block 80. If not, ECU 12 returns to block 70 to stay in the low severity loop. If a time out has occurred at block 80, ECU returns to start block 60.

If the criteria has been met for the number of fault events within the low severity loop time period t2 at block 78, ECU 12 decrements a position of the exhaust valve 32 within its current state. In other words, the ECU 12 moves the exhaust valve 32 incrementally downwardly to further restrict the exhaust port 28 within its current state position. For example, if the exhaust valve 32 is in its up state position 36, the exhaust valve 32 is moved downwardly to an incremental position between the up state position 36 and middle state position 38. If exhaust valve 32 is in its middle state position, the exhaust valve 32 is moved downwardly to an incremental position between the middle state position 38 and down state position 42. This permits fine tuning of the size of exhaust port 28 to control of engine speed and power between the three illustrated state positions of the exhaust valve 32.

It is understood that more than three state positions may be provided for the exhaust valve 32 in another embodiment of the present disclosure. In yet another embodiment, only two states are provided for the exhaust valve position.

In another embodiment, a multi-dimensional approach is used to reduce thermal shock. The ECU 12 controls the maximum position of exhaust valve 32 as a function of a representative engine temperature from coolant temperature sensor 48, and also imposes an enforced idle state using an engine speed limiter 49 upon first engine start up. The use of an enforced idle state that is operational for a pre-determined period of time allows for the engine temperature to stabilize prior to allowing the operator to command higher power levels.

Providing active engine speed and engine power output control using exhaust valve position gives provides:

Transparent initialization capability—Reduction in abrupt engine speed changes and/or vehicle momentum.

Run quality and overall refinement improvement when in the fault state.

Reduction in detonation events and misfires as the strategy cycles.

Capacity to add multi-dimensional, intra-state steps in maximum valve position further increasing the capability of the system to only act as much as is needed to protect the engine.

Reduction in large cycle to cycle exhaust temperature gradients in the fault state.

Cold drive-away improvement by limiting engine speed rather than imposing missed engine cycles.

True reduction in commandable power and, as a result, the load on the piston during the critical first stages of thermal expansion when the engine is started (hot or cold).

While embodiments of the present disclosure have been described as having exemplary designs, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A method for selectively reducing power of a two-stroke engine having at least one piston movable in a cylinder and an exhaust port, the method comprising:

providing an exhaust valve in communication with the exhaust port of the engine, the exhaust valve having an adjustable position to change an effective size of the exhaust port;

sensing a condition likely to cause damage to the piston of the engine;

signaling the condition likely to cause damage to the piston of the engine; and adjusting a state position of the exhaust valve to reduce a size of the exhaust port in response to sensing the condition likely to cause damage to the piston of the engine, thereby limiting power of the engine, by:

measuring fault events at a manifold pressure sensor, a detonation sensor, a valve position sensor, an exhaust temperature sensor, and an engine water temperature sensor;

adjusting, selectively, a position of the exhaust valve to one of a plurality of incremental positions between an up state position, at least one middle state position, and a down state position to fine tune the effective size of the exhaust port and limit the power of the engine, and the at least one middle state position is located between the up state position and the down state position;

evaluating a severity of the sensed condition;

adjusting the state position of the exhaust valve if the severity of the sensed condition exceeds a predetermined severity threshold;

incrementally adjusting the position of the exhaust valve without changing a current state position of the exhaust valve if the severity of the sensed condition is below the predetermined severity threshold; and determining whether a first predetermined number of fault events occur within a first predetermined time period and adjusting the state position of the exhaust valve to reduce the size of the exhaust port if the first predetermined number of fault events occur within the first predetermined time period, wherein incrementally adjusting the position of the exhaust valve includes determining whether a second predetermined number of fault events occur within a second predetermined time period and incrementally adjusting the state position of the exhaust valve without changing the current state position of the exhaust valve if the second predetermined number of fault events occur within the second predetermined time period.

2. The method of claim 1, wherein the sensed condition is an engine fault condition.

3. The method of claim 1, wherein the sensed condition is an engine temperature above a predetermined overheated temperature threshold.

4. The method of claim 1, wherein the sensed condition is an engine temperature below a predetermined cold temperature threshold.

5. The method of claim 1, wherein adjusting the state position of the exhaust valve includes selectively changing the state position of the exhaust valve relative to the exhaust port between the up state position in which the exhaust port is fully open and the down state position in which the exhaust port is restricted to reduce the power of the engine.

6. A two-stroke engine comprising:
   at least one piston movable in a cylinder;
   an inlet port;
   an exhaust port;
   an exhaust valve in communication with the exhaust port, the exhaust valve having an adjustable position to change an effective size of the exhaust port;
   a manifold pressure sensor, a detonation sensor, a valve position sensor, an exhaust temperature sensor, and an engine water temperature sensor each configured to sense a condition likely to cause damage to the piston of the engine; and
   an engine control unit coupled to the sensor, the engine control unit being configured to:
      adjust a state position of the exhaust valve to reduce a size of the exhaust port in response to sensing the condition likely to cause damage to the piston of the engine;
      adjust the state position of the exhaust valve by selectively changing a position of the exhaust valve relative to the exhaust port between an up state position in which the exhaust port is fully open, a down state position in which the exhaust port is restricted to reduce the power of the engine, and at least one middle state position located between the up state position and the down state position;
      adjust the exhaust valve to one of a plurality of incremental positions between the up state position, the at least one middle state position, and the down state position to fine tune the effective size of the exhaust port and limit the power of the engine;
      evaluate a severity of the sensed condition;
      adjust the state position of the exhaust valve if the severity of the sensed condition exceeds a predetermined severity threshold;
      incrementally adjust the position of the exhaust valve without changing a current state position of the exhaust valve if the severity of the sensed condition is below the predetermined severity threshold;
      determine whether a first predetermined number of fault events occur within a first predetermined time period and adjust the state position of the exhaust valve to reduce the size of the exhaust port if the first predetermined number of fault events occur within the first predetermined time period; and
      determine whether a second predetermined number of fault events occur within a second predetermined time period and incrementally adjust the state position of the exhaust valve without changing the current state position of the exhaust valve if the second predetermined number of fault events occur within the second predetermined time period.

7. The engine of claim 6, wherein the sensor senses one of an engine fault condition, an engine temperature above a predetermined overheated temperature threshold, and an engine temperature below a predetermined cold temperature threshold.

* * * * *